United States Patent [19]

Thomas et al.

[11] Patent Number: 4,492,503

[45] Date of Patent: Jan. 8, 1985

[54] HIGH SPEED PUSHER

[75] Inventors: Paul M. Thomas, Paradise Valley; Daniel P. Abrahamson, Phoenix, both of Ariz.

[73] Assignee: Builders Equipment Company, Phoenix, Ariz.

[21] Appl. No.: 496,331

[22] Filed: May 23, 1983

Related U.S. Application Data

[63] Continuation of Ser. No. 225,714, Jan. 16, 1981, abandoned.

[51] Int. Cl.³ .............................................. B66C 17/08
[52] U.S. Cl. .................................... 414/152; 414/156; 198/485
[58] Field of Search ............... 414/150, 152, 156, 157, 414/176, 277, 278, 280, 198; 198/485, 747; 271/269

[56] References Cited

U.S. PATENT DOCUMENTS

| | | | |
|---|---|---|---|
| 2,685,374 | 8/1954 | Croston | 414/280 |
| 3,671,165 | 6/1972 | Schwellenbach | 425/445 |
| 3,719,288 | 3/1973 | Schmitt et al. | 414/280 |
| 3,850,316 | 11/1974 | Schmitt | 414/152 X |
| 4,227,847 | 10/1980 | Bossetti | 414/152 |

Primary Examiner—Leslie J. Paperner
Assistant Examiner—David A. Bucci
Attorney, Agent, or Firm—Luedeka & Neely

[57] ABSTRACT

An apparatus for transferring palletized uncured concrete blocks to a curing kiln from a block making station and rapidly loading the palletized uncured blocks into the kiln. Typical kilns include a plurality of rows of tiered passageways extending from an open front end to an open rear end of the kiln. The transferring and loading apparatus includes a conveyor device for moving palletized blocks from the block making station to a location below the open front end of any selected one of the passageways a distance greater than the height of the palletized blocks, a lifting device for lifting the pallet of blocks from the conveyor device to the open front end of the selected passageway, and a palletized block moving device for moving the pallet of blocks from the lifting device into the selected passageway as another pallet of uncured blocks moves into position on the conveyor device below the selected passageway.

6 Claims, 8 Drawing Figures

HIGH SPEED PUSHER

This is a continuation of application Ser. No. 225,714, filed 1/16/81, now abandoned.

FIELD OF THE INVENTION

The present invention relates to material handling apparatus, and more particularly to an apparatus for moving uncured concrete blocks to a curing kiln and loading the blocks into the kiln.

BACKGROUND AND SUMMARY OF THE INVENTION

In any high volume manufacturing process it is necessary to rapidly move the items being processed from one manufacturing step to the succeeding step. This is true also in the production of concrete blocks such as used in the building construction trade.

To date, one bottle neck in the high volume production of concrete blocks has been the rapid transfer of blocks to the curing kiln and the loading of blocks into the curing kiln.

Typically, the transfer of uncured blocks to the curing kiln from the previous manufacturing step must be interrupted while uncured blocks are being loaded nto the curing kiln. This interruption in the flow of uncured blocks to the curing kiln slows down the entire manufacturing process. The primary interruption occurs because a succeeding pallet cannot be moved into a loading position until a previous pallet has been loaded and the pusher means returns to its initial position. This interruption becomes increasingly unacceptable with an increase in the length of the pallets carrying the blocks. With short pallets, carrying two blocks, for example, the period of time required to move a succeeding pallet into the loading position is not significantly different than the time required to push the pallet laterally into the kiln. However, a pallet carrying six blocks in a substantially linear arrangement, for example, requires a greater period of time to travel along its length to a loading position, than it does to travel laterally into the kiln. While it may be desirable to merely increase the speed of travel of the pallets, such a solution is unacceptable in view of the fact that uncured blocks are quite sensitive to sudden shocks caused by rapid acceleration or deceleration.

An object of the invention is to provide an apparatus for transferring uncured concrete blocks to a curing kiln and loading the concrete blocks into the curing kiln without interruption in the transfer or flow of blocks to the kiln from the previous manufacturing operation.

Another object of the present invention is to accomplish the loading of concrete blocks into the curing kiln without damaging the relatively delicate uncured concrete block.

These and other objects of the present invention will become known by reference to the specification and accompanying drawings wherein like numerals refer to like parts throughout and in which:

DETAILED DESCRIPTION

Figure 1:
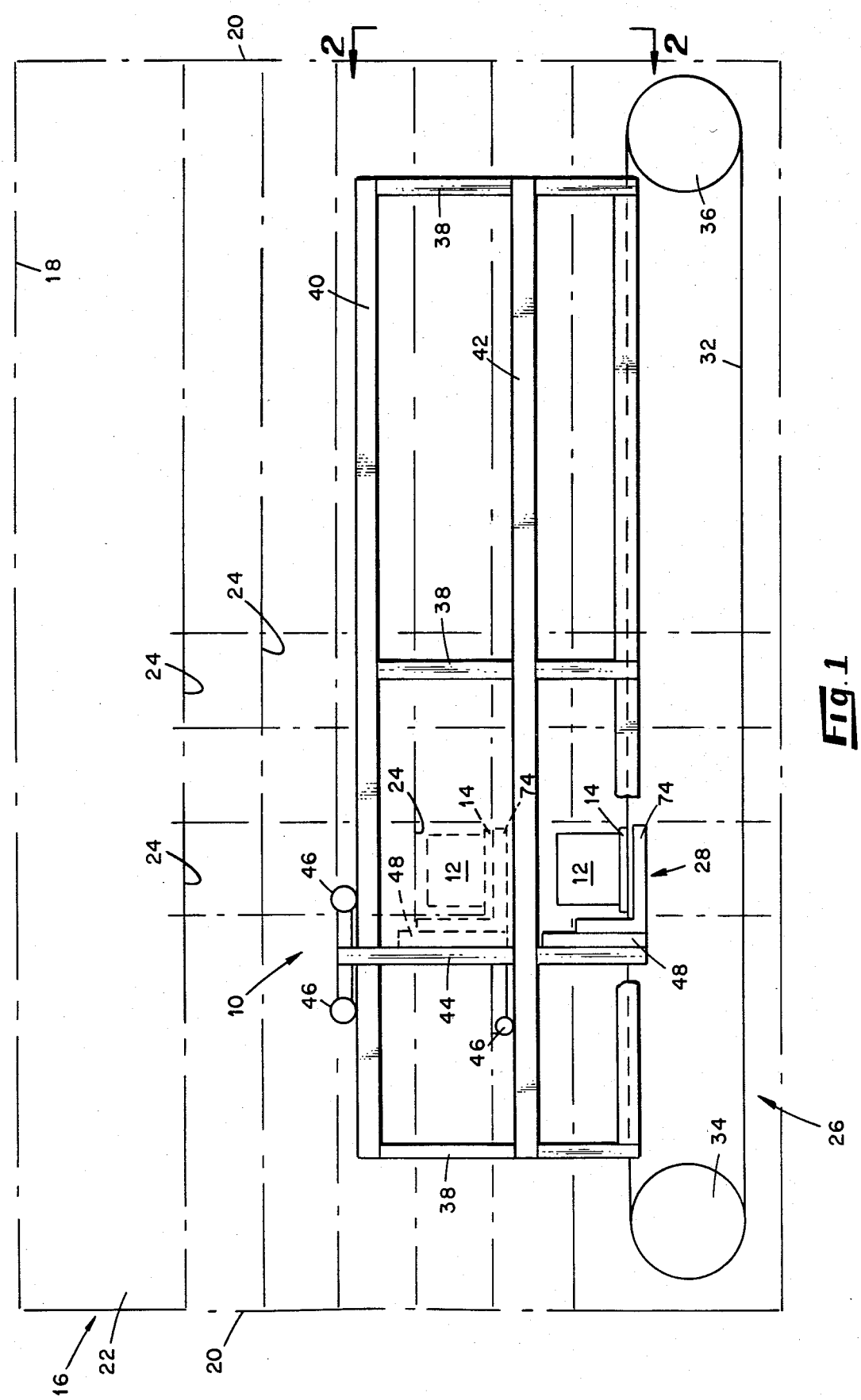
FIG. 1 is a front diagrammatic view of a curing kiln with an apparatus for transferring and loading concrete blocks embodying various features of the present invention.

The present invention, in a preferred form, provides an apparatus, generally denoted as the numeral 10, for transferring uncured concrete blocks 12 on pallets 14 to a curing kiln 16 from a block making work station and for loading the palletized uncured blocks 12 into the kiln 16.

Typical curing kilns 16 have a roof 18, spaced apart side walls 20, an open front or receiving end 22 through which the palletized blocks 12 to be cured are loaded into the kiln and an open rear or discharge end on the opposite side of the kiln from the open front end 22 through which palletized cured blocks are removed from the kiln. The interior of the kiln is divided by appropriate vertical and horizontal structural members into a plurality of rows of tiered passageways 24 extending from the open front end to the open rear end of the kiln. Palletized uncured blocks 12 are loaded into the passageways 24 at the open front end 22 of the kiln 16 and are moved or indexed along the passageways 24 to the open rear end for removal from the kiln 16.

The palletized uncured concrete blocks 12 are transferred from a block making work station to the kiln 16 by a conveyor device 26 to a location spaced below the open front end of any selected passageway 24 by a distance greater than the height of the palletized uncured blocks 12 as can be best seen in FIG. 1. The pallet of uncured blocks 12 located on the conveyor device beneath the selected passageway 24 is lifted off the conveyor device 26 and elevated to an unloading position or location in-line with the open front end of the selected passageway 24, as shown in broken lines in FIG. 1, by lifting means 28. The elevated pallet of uncured blocks 12, located in register with the selected passageway 24 is moved from the lifting means 28 and into the selected passageway by reciprocating moving means 30 as, concurrently, the next pallet of uncured blocks to be loaded into the selected passageway 24 moves into position on the conveyor device 26 beneath the elevated lifting means 28. After the first elevated pallet of blocks is partially loaded into the selected passageway 24 the lifting means 28 descends to the conveyor device 26, picks up the next pallet of blocks and the above-described loading sequence is repeated as yet another pallet of uncured blocks 12 moves into position below the lifting means 28 on the conveyor device 26. Thus, there is a continuous flow of palletized uncured blocks 12 to the kiln and the transfer operation is not interrupted while a pallet of blocks is being loaded into the kiln and the pusher member returns, thus greatly speeding up the manufacturing process.

Figure 2:
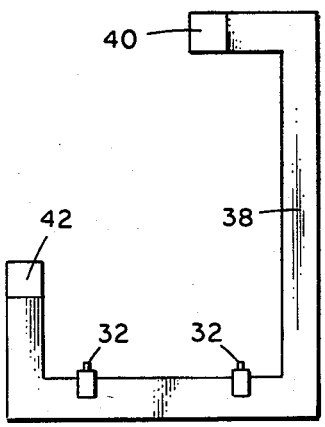
FIG. 2 is an end view of a conveyor device as viewed in the direction of arrows 2—2 in FIG. 1.

With reference to FIGS. 1 and 2, the conveyor device 26 is illustrated as an endless double chain-type conveyor having two spaced apart parallel endless chains 32 trained about a head pulley 34 and a tail pulley 36. The endless chains 32 are spaced apart a distance less than the width of the pallets 14 which are supported on and travel with the chains 32. The conveyor device 26 is horizontally disposed across and in close proximity to the open front end 22 of the kiln 16 and is mounted for selected vertical movement between tiered rows of passageways 24 on appropriate structural members so that after one row of passageways 24 has been filled with palletized blocks 12 the conveyor device is moved vertically to the next tier of passageways and the loading of palletized uncured blocks 12 into the kiln 16 continues. The conveyor device 26 is shown as being constructed of a frame comprising a plurality of spaced apart generally J-shaped members 38 transverse to the endless chains 32 which are connected to a plurality of longitudinal members at their points of intersection. The first longitudinal member 40 and second longitudinal member 42 function to support the lifting means 28 adjacent to the conveyor device 26 and provide rails upon which the lifting means 28 can move along the conveyor device 26 from one passageway 24 of a row to another passageway.

Now with reference to FIGS. 3 through 8, the lifting means 28 is illustrated as comprising a generally vertically oriented mounting plate 44 having powered rollers 46 which ride on the first and second longitudinal members 40 and 42, respectively, of the conveyor device 26 to support the lifting means 28 and provide for longitudinal movement of the lifting means 28 along the conveyor device 26. The lifting means 28 also comprises a carriage 48 generally superimposed over the mounting plate 44 and connected to the mounting plate 44 for vertical movement relative thereto. The mounting plate 44 includes vertical ways 50 and the carriage includes parallel spaced apart rollers 52. The spaced apart rows of rollers 52 are disposed on opposite sides of the ways 50 to capture the ways 50 between them and slide along the ways so that the carriage 48 is vertically movable relative to the mounting plate 44. The carriage 48 is caused to move vertically with respect to the mounting plate 44 by means of, for example, a vertically disposed hydraulic or pnuematic cylinder device 54 which is interconnected to the mounting plate 44 and carriage 48. For example, the cylinder 56 can be attached to the mounting plate 44 and the rod 58 can be attached to the carriage 48 so that when the cylinder device 54 is pressurized the rod 58 will extend from the cylinder 56 to move the carriage 48 vertically upwardly along the ways 50 of the mounting plate 44. When de-pressurized, the rod 58 will retract into the cylinder 56, to move the carriage 48 vertically downwardly along the ways 50 of the mounting plate 44. The lifting means 28 further includes pallet support means 60 which are mounted to the carriage 48 for movement therewith and for movement relative to the carriage 48 between a pallet support position, shown in solid lines in FIG. 3, and a pallet clearance position, shown in broken lines in FIG. 3. The pallet support means 60 is illustrated as comprising a first support bracket 62 pivotally mounted to the carriage 48 and spaced from and generally parallel to a second support bracket 64 which is also pivotally mounted to the carriage 48. Each support bracket 62 and 64 is shown as being generally L-shaped with the top end of the vertical arm 66 and 68, respectively, pivotally connected at numeral 70 to the carriage 48 and with their horizontal arms 72 and 74, respectively, projecting away from the carriage 48 in general parallel relationship. The horizontal arm 72 of the first support bracket 62 includes casters 76 freely rotatably mounted thereto with their axis of rotation in-line with the length of the horizontal arm 72. The first support bracket 62 is the one which is located closest to the kiln 16. The horizontal arm 74 of the second support bracket 64 is formed with an open cut-out portion or notch 78 for a purpose to be discussed below. The horizontal arms 72 and 74 are, thus, adapted to fit beneath and support a pallet of blocks with the pallet 14 resting on the casters 76 of the horizontal arm 72 of the first support bracket 62 and on the horizontal arm 74 of the second support bracket 64 over the notch 78.

The first and second support brackets 62 and 64, respectively, are caused to selectively and concurrently pivot about their pivot attachments 70 toward and away from each other by means illustrated as a horizontally disposed hydraulic or pneumatic cylinder device 80 extending across the space between the first and second support brackets and interconnected to both the first support bracket 62 and second support bracket 64. The cylinder 82 of the cylinder device 80 is attached, for example, to the first support bracket 62 and the rod 84 of the cylinder device 80 is connected to the second support bracket 64. When the cylinder 82 is pressurized, the rod 84 extends out of the cylinder 82 concurrently pivotally moving the support brackets 62 and 64 away from each other, and when the cylinder 82 is de-pressurized the rod 84 moves back into the cylinder 82 concurrently pivotally moving the support brackets 62 and 64 toward each other. It should be noted that when the support brackets 62 and 64 are pivoted toward each other to the pallet support position, the arms 72 and 74 are spaced apart by a distance which is less than the width of a pallet 14 and greater than the distance between the distance between the chains 32 of the conveyor device 26. When the brackets 62 and 64 are pivoted away from each other to the pallet clearance position, the arms 72 and 74 are spaced apart by a distance greater than the width of a pallet 14.

Figure 3:
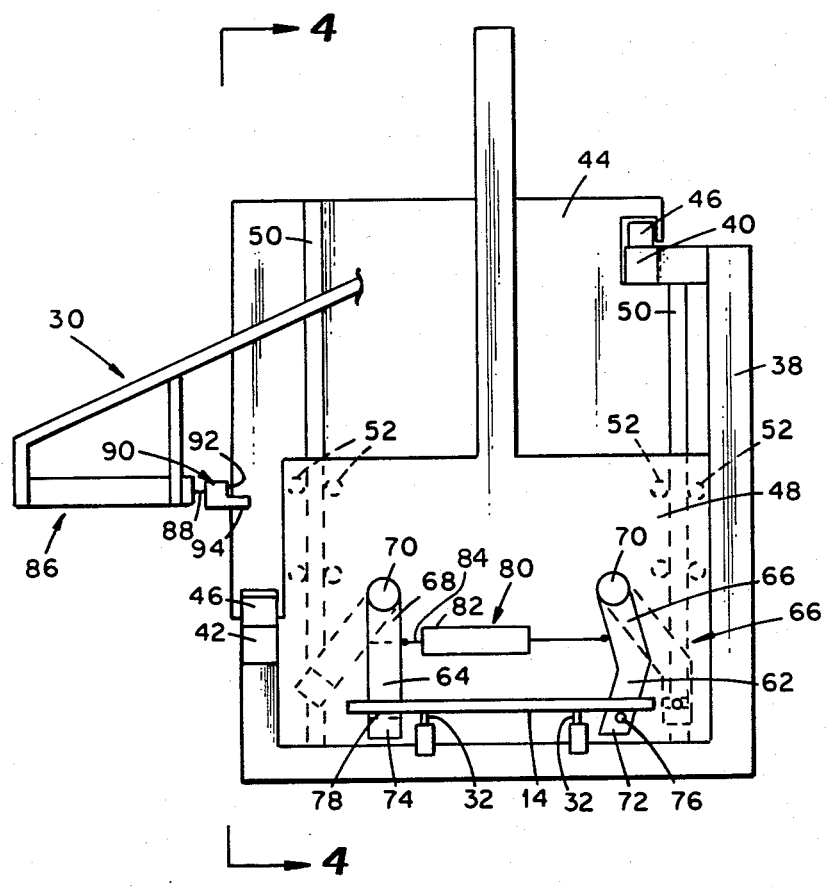
FIG. 3 is an end view of the conveyor device having a pallet lift embodying various features of the present invention.
Figure 4:
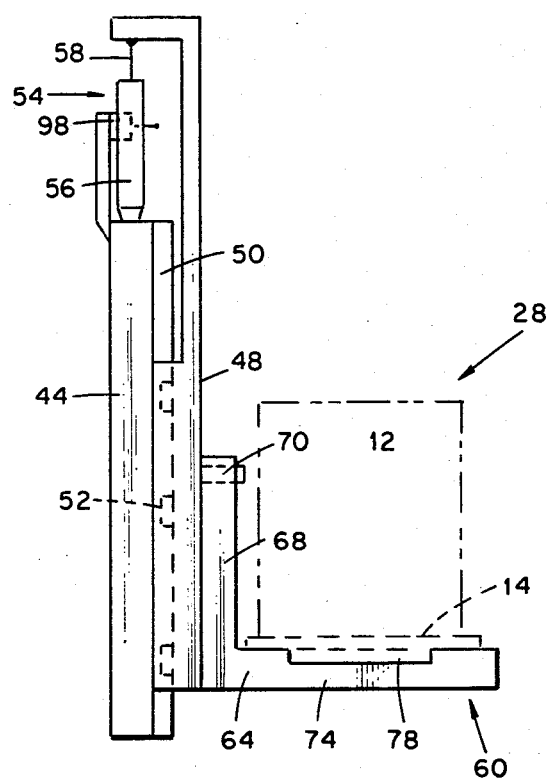
FIG. 4 is a side view of the lift device as viewed in the direction of arrows 4—4 in FIG. 3.
Figure 5:
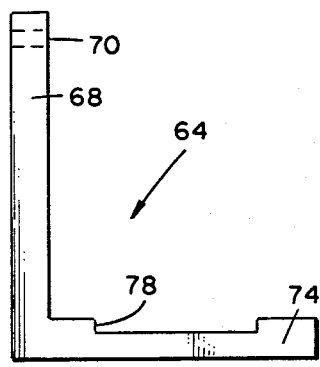
FIG. 5 is a side view of a lift arm component of FIG. 4.
Figure 6:
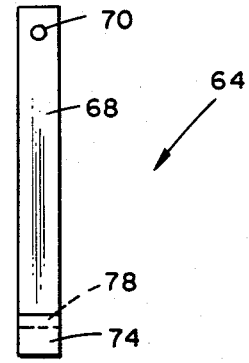
FIG. 6 is an end view of FIG. 5.
Figure 7:
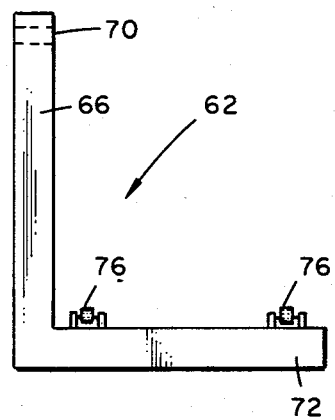
FIG. 7 is a side view of another lift arm component of FIG. 4.
Figure 8:
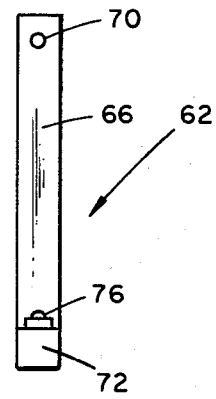
FIG. 8 is an end view of FIG. 7.

As illustrated in FIG. 3, the reciprocating means 30 comprises, for example, a hydraulic or pneumatic cylinder device 86 mounted upon the lifting means 28. The reciprocating means 30 is oriented generally horizontally and in-line with the plane of a pallet supported on the horizontal arms 72 and 74 of the first and second pallet support brackets 62 and 64, respectively, and adjacent the second support bracket 64. The piston rod 88 projects generally in the direction from the second support bracket 64 toward the first support bracket 62. A pallet engaging pad 90 is attached to the projecting end of the piston rod 88 for movement therewith. The pallet engaging pad 90 is shaped in a configuration defining a step or shoulder 92 which engages the edge of the pallet 14 extending outwardly from the horizontal arm 74 of the second support bracket 64. The projecting lip 94 of the shoulder 92 extends horizontally through the notch 78 in the horizontal arm 74 as the pad 90 passes by the arm 74. Thus, the pallet 14 is supported on the lip 94 as the pallet 14 slides off of the arm 74.

When the lifting means 28 has elevated a pallet of uncured blocks 12 to a position generally in-line with the selected passageway 24, the cylinder device 86 is activated so that the piston rod 88 extends from the cylinder toward the pallet 14 holding the blocks 12. As mentioned above, the shoulder 92 of the pad 90 engages the edge of the pallet 14 and the lip 94 moves into the notch 78 in the horizontal arm 74 of the second pallet support bracket 64. The piston rod 88 continues to extend from the cylinder of the cylinder device 86 toward the first pallet support bracket 62 so that the pad 90 pushes the pallet 14 off the horizontal arm 74 of the second support bracket 64, across the horizontal arm 72 of the first pallet support bracket 62 toward and into the selected passageway 24 of the kiln 16. After the pallet 14 has been pushed from the horizontal arm 74 of the second pallet support bracket 64 it is supported on the lip 94 defined by the shoulder 92 of the pad 90 and easily rolls on the casters 76 mounted on the horizontal arm 72 of the first support bracket 62. After at least about one-half of the pallet 14 has entered the selected passageway 24, the pallet is supported sufficiently to permit the arms 72 and 74 to be lowered to pick up the next succeeding pallet, which is moving into position. When the pallet 14 is completely inserted into the passageway 24, the cylinder device 86 retracts the piston rod 88 with the pallet engaging pad back away from the pallet support brackets 62 and 64.

To pick up another pallet 14 to be loaded into the selected passageway 24, the pallet support brackets 62 and 64 are pivoted away from each other about their pivot mountings 70 by cylinder device 80 to the pallet clearance position. The pallet support brackets 62 and 64 in the pallet clearance position move past the edges of the pallet 14 on the conveyor device 26 until the horizontal arms 72 and 74 of the first and second brackets 62 and 64, respectively, are beneath the pallet supported on the chains 32 of the conveyor device 26. The cylinder device 54 is de-activated to stop further movement of the carriage 48 and the cylinder device 80 is activated to pivot the first and second brackets 62 and 64 toward each other and move the horizontal arms 72 and 74 of the first and second brackets 62 and 64, respectively, to a pallet support position beneath the pallet 14 on the conveyor chains 32. The cylinder device 54 is again activated to raise the carriage 48 upwardly with the pallet of blocks supported on the horizontal arms 72 and 74 to the position generally in-line with the selected passageway 24 and the unloading of the pallet of blocks into the selected passageway of the kiln is repeated while yet another pallet of blocks moves into position on the conveyor device below the selected passageway 24.

In order to properly position the carriage 48 at the selected passageway 24 with the pallet 14 generally in-line with the passageway, a limit switch means 98 is mounted to the mounting plate 44 and is operatively associated with the cylinder device 54 for controlling movement of the carriage 48. This limit switch means 98 is activated by engagement of the carriage 48 with a suitable stop mounted upon the kiln when the carriage 48 reaches the proper position in which the pallet 14 of blocks is in-line with the selected passageway 24. At that point the switch means 98 de-activates the cylinder device 54 to stop further upward movement of the carriage 48.

After one passageway of a row is filled with pallets of blocks, the lifting means 28 is moved on the rollers 46 along the first and second longitudinal members 40 and 42 of the conveyor device 26 to the next passageway 24 in that row and the loading of the next passageway commences.

After a row of passageways has been loaded with pallets of blocks 12, the conveyor device 26 is moved to the next tier of passageways 24 and the loading of passageways 24 in that tier commences.

Employing an apparatus in accordance with the present invention permits a pallet to be moved into a position directly below and in front of a selected passageway while the prior pallet is being transferred into the kiln and the pusher is being retracted. Thus, the speed of loading can be increased substantially.

The foregoing detailed description is given primarily for clearness of understanding, and no unnecessary limitations should be understood therefrom for modifications will be obvious to those skilled in the art upon reading this disclosure and can be made without departing from the spirit of the invention or the scope of the appended claims.

What is claimed is:

1. In an apparatus for conveying and lifting blocks on rigid pallets to an elevated position for being loaded into a loading opening of a kiln with the apparatus including a conveyor extending parallel to the face of the loading opening for conveying palletized blocks to a position beneath the loading opening, the width of said pallets being the distance across said pallet in a direction perpendicular to the conveyor and the length of the pallets being the distance across the pallet in a direction parallel to the conveyor, the improvement comprising:

a pair of elongated pallet support arms, each having first and second ends disposed longitudinally in an orientation generally parallel to the conveyor and having a length between said first and second ends of about the length of the pallets for being disposed below and along the length of the pallets;

lifting means;

mounting means for mounting only said first end of each of said support arms on said lifting means and providing for lateral movement of said support arms in a direction generally perpendicular to the conveyor;

actuation means for moving said support arms laterally between a clearance position, wherein said support arms are spaced apart at a distance greater than the width of the pallets, and a support position, wherein said support arms are spaced apart at a distance less than the width of the pallets;

said lifting means being operable to move said support arms between a lowered position that is at least beneath the level of the conveyor and a raised position wherein said support arms are level with the lower surface of the loading opening of the kiln, whereby palletized blocks may be lifted from the conveyor by moving said support arms to the clearance position, lowering said support arms to the lowered position, moving said support arms to the support position beneath the pallet on the conveyor, raising said support arms to the raised position to raise the palletized blocks to the level of the loading opening of the kiln; and pusher means for pushing palletized blocks in a direction perpendicular to the length of said support arms and the conveyor when said support arms are in the raised position to push the palletized blocks into the loading opening.

2. The improvement of claim 1 wherein said mounting means comprise:

a pair of bracket arms each disposed adjacent to the same length-defining side of a pallet, each of said bracket arms being pivotally mounted at one end of said lifting means in an orientation for pivotal movement in a vertical plane and one of said support arms extending from the other end of each of said bracket arms in a direction generally perpendicular to the vertical plane;

said bracket arms being operable to move said support arms between the support position and the clearance position.

3. The improvement of claim 2 wherein said actuation means comprises a piston-cylinder set operating between said bracket arms.

4. The improvement of claim 1 wherein said pusher means comprises a stepped pad adapted to engagee the side and bottom of the pallet when said support arms are in the raised position to push the pallet and palletized blocks from said support arms.

5. In an apparatus for conveying and lifting blocks on rigid pallets to an elevated position being loaded into a loading opening of a kiln with the apparatus including a conveyor extending parallel to the face of the loading opening for conveying palletized blocks to a position beneath the loading opening and the width of said pallets being the distance across the pallet in a direction perpendicular to the conveyor, the improvement comprising:

a pair of elongated pallet support arms disposed with their longitudinal dimension generally parallel to the conveyor and to the loading opening;

lifting means;

mounting means disposed adjacent to one end of the pallets for mounting only one end of each of said support arms on said lifting means with both of said support arms extending from said lifting means in a direction opposite the direction of motion of the conveyor, said mounting means providing for lateral movement of said support arms;

actuation means for moving said support arms laterally between a clearance position, wherein said support arms are spaced apart at a distance greater than the width the pallets, and a support position, wherein said support arms are spaced apart at a distance less than the width of the pallets;

said lifting means being operable to move said support arms between a lowered position that is at least beneath the level of the conveyor and a raised position wherein said support arms are level with the lower surface of the loading opening of the kiln, whereby palletized blocks may be lifted from the conveyor by moving said support arms to the clearance position, lowering said support arms to the lowered position, moving said support arms to the support position beneath the pallet on the conveyor, raising said support arms to the raised position to raise the palletized blocks to the level of the loading opening of the kiln; and pusher means for pushing palletized blocks in a direction perpendicular to said support arms and the conveyor when said support arms are in the raised position so that palletized blocks may be pushed into the loading opening.

6. The improvement of claim 5 wherein said pusher means comprises a stepped pad adapted to engage the side and bottom of the pallet when said arms are in the raised position to push the pallet and palletized blocks from said support arms.

* * * * *